(12) United States Patent
Ashizawa et al.

(10) Patent No.: US 6,456,350 B1
(45) Date of Patent: Sep. 24, 2002

(54) LIQUID CRYSTAL DISPLAY

(75) Inventors: Keiichiro Ashizawa; Masayuki Hikiba; Kazuhiko Yanagawa; Kenta Kamoshida, all of Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/303,429

(22) Filed: May 3, 1999

(30) Foreign Application Priority Data

May 8, 1998 (JP) .......................................... 10-125573

(51) Int. Cl.[7] ............................................. G02F 1/1343
(52) U.S. Cl. ........................................ 349/141; 349/143
(58) Field of Search ................. 349/141, 143, 349/139

(56) References Cited

U.S. PATENT DOCUMENTS

| | | | | |
|---|---|---|---|---|
| 5,600,464 A | * | 2/1997 | Ohe et al. | 349/123 |
| 5,870,160 A | * | 2/1999 | Yanagawa et al. | 349/141 |
| 5,978,059 A | * | 11/1999 | Ohta et al. | 349/141 |
| 5,995,186 A | * | 11/1999 | Hiroshi | 349/141 |
| 6,198,520 B1 | * | 3/2001 | Kondo et al. | 349/141 |
| 6,335,770 B1 | * | 1/2002 | Komatsu | 349/141 |

* cited by examiner

Primary Examiner—William L. Sikes
Assistant Examiner—Dung Nguyen
(74) Attorney, Agent, or Firm—Antonelli, Terry, Stout & Kraus, LLP

(57) ABSTRACT

Wave-form distortion of a reference signal or signals being supplied to an opposed electrode can be suppressed without suffering from an increase in the size of the it "window casing" structure. In a liquid crystal display device having respective pixel regions laid out in a matrix form in a display area on a liquid crystal-side surface of one transparent substrate of respective transparent substrates that are disposed opposite each other with a liquid crystal sandwiched therebetween, and also having a pixel electrode and an opposed electrode that are disposed so that these electrodes are spaced apart from each other in each of these pixel regions, the transmissivity of light travelling between respective electrodes is controlled by an electric field created between respective ones of these electrodes. In this display device, parallel opposed voltage signal lines which cause respective opposed electrodes within respective pixel regions to be connected together extend in a row direction, and a common bus line connecting respective ones of said opposed voltage signal lines is formed within said display area so that it extends in a column direction.

10 Claims, 12 Drawing Sheets

LIQUID CRYSTAL DISPLAY

Background of invention

(1) Field of the Invention

The present invention relates to liquid crystal display devices and, in more particular, to liquid crystal display devices of the so-called lateral electric field type.

(2) Description of the Prior Art

A liquid crystal display device categorized in the so called lateral electric field scheme is provided with respective transparent substrates opposing each other with a liquid crystal sandwiched between them, one of which has its liquid crystal-side surface with pixel regions defined thereon, in each of which a pixel electrode and an opposed electrode are disposed so that these are spaced apart from each other, the device being configured such that an electric field generatable between these respective electrodes is used to control the transmissivity of light travelling between respective electrodes.

The liquid crystal display device with the configuration above is capable of recognition of clear and crisp images even when looking at from view points at large angles with respect to its display plane, and for this reason has been known as the one that is excellent in what is called the angular viewability.

And, since the pixel electrode of each pixel region is arranged so that an image signal corresponding to the transmissivity of light to be controlled is supplied with respect to a reference signal being applied to an opposed electrode, the same signal is to be supplied via a signal line to each opposed electrode in each pixel region.

Practically, there are respective pixel regions in a display area, which are laid out in a matrix form, along with parallel opposed voltage signal lines which are formed extending in the column direction for letting respective opposed electrodes within respective pixel regions as disposed in the row direction be connected with one another; further, a common bus line is formed for connecting together these opposed voltage signal lines on one end side of each opposed voltage signal line lying outside of the display area.

More specifically, a reference signal is arranged to be supplied via the common bus line and each opposed voltage signal line to the opposed electrode in each pixel region.

Note that such arrangement has been disclosed in detail in, for example, Published Unexamined Japanese Patent Application ("PUJPA") No. 6-160878.

In this case it has been pointed out that supplying the reference signal to the opposed electrode via the common bus line and each opposed voltage signal line would result in an extreme increase in distortion of signal waveform when compared to signal transmission to other electrodes.

This is because the signal line connected to the opposed electrode must be formed to be longer than those signal lines connected to the other electrodes and also because a capacitance with the liquid crystal used as its dielectric material is coupled thereto.

Due to this, typical prior art approaches have become known in which a common bus line for connecting together these opposed voltage signal lines is formed even at the remaining ends of respective opposed voltage signal lines lying outside of the display area to thereby supply the reference voltage together with the other common bus line.

SUMMARY OF THE INVENTION

In the case where respective common bus lines are formed on respective end sides of each opposed voltage signal line, a correspondingly increased space must be reserved resulting in a problem of incapability to miniaturize or shrink the so-called "window casing" frame.

It should be noted that the term "window casing" as used herein may refer to a specific portion on the display plane between its outer frame (of the display panel) and the display area, wherein shrinkage of such window casing permits enlargement of the aperture ratio of each pixel region under the assumption that the outer frame is constant while at the same time enabling down-sizing of the display panel where the aperture ratio of each pixel region is kept constant.

The present invention has been made in view of the technical background above, and its primary objective is to provide a liquid crystal display device capable of suppressing waveform distortion of more than one reference signal being supplied to opposed electrodes without suffering from an increase in window casing.

In the inventions as disclosed herein, a brief summary of a representative one of them will be set forth below.

In summary, in a liquid crystal display device which comprises respective pixel regions laid out in a matrix form in a display area on a liquid crystal-side surface of one transparent substrate of respective transparent substrates as disposed opposing each other with a liquid crystal sandwiched therebetween, and also comprises a pixel electrode and its opposed electrode disposed so that these are spaced apart from each other in each of these pixel regions, wherein the transmissivity of light passing between respective electrodes is controlled by an electric field as created between these respective electrodes, and wherein parallel opposed voltage signal lines connecting together respective opposed electrodes within each of the pixel regions laid out in a row direction are formed in a column direction, characterized in that a common bus line connecting together respective ones of said opposed voltage signal lines is formed within said display area so that it extends in the column direction.

The liquid crystal display device thus- arranged becomes capable of suppressing any possible distortion of a reference signal being supplied from the common bus line via an opposed voltage signal line toward the opposed electrode because of the fact that the voltage signal line is substantially shortened reducing its electrical resistivity.

And, it is no longer required that any common bus line for common connection of opposed voltage signal lines be provided on the opposite sides of these lines(outside of the display area), which in turn makes it possible to permit shrinkage or down-sizing of a window casing.

In addition, even where an attempt is made to provide a common bus line for use in connecting together the opposed voltage signal lines on their opposite sides (or alternatively on one side), it is still possible to reduce waveform distortion of such reference signal thereby enabling reduction of the line width thereof. Accordingly, window-casing miniaturization may be accomplished.

DESCRIPTION OF THE PREFERRED EMBODIMENTS

Some preferred embodiments of the liquid crystal display device in accordance with the present invention will be explained using the accompanying drawings below.

Embodiment 1
[Overall Configuration]

Figure 1:
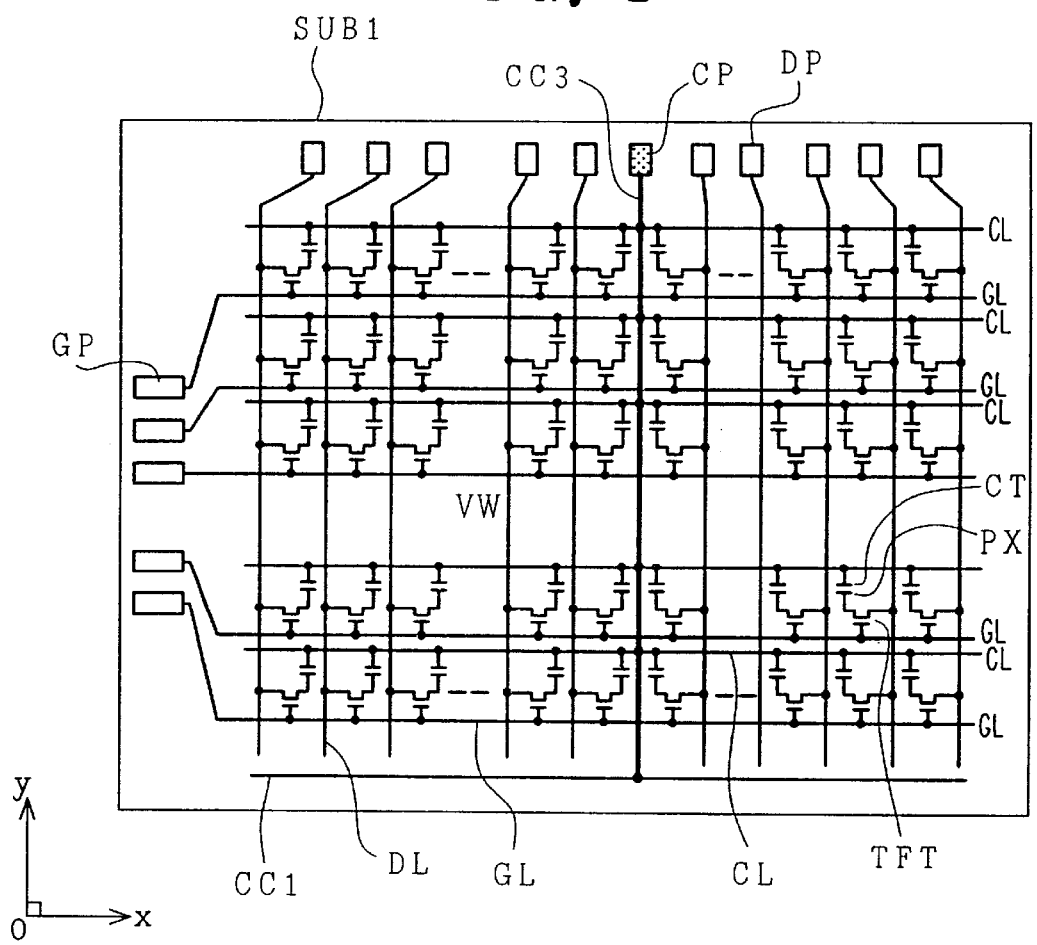
FIG. 1 is an equivalent circuit diagram showing an overall configuration showing one embodiment of a liquid crystal display device in accordance with the present invention.

FIG. 1 is an equivalent circuit diagram showing one embodiment of the liquid crystal display device incorporating the principles of the present invention.

Although the same drawing is an equivalent circuit diagram, this is illustrated in a way nearly corresponding to the real geometric layout, which corresponds to a plan view diagram showing a liquid-crystal side surface of one transparent substrate of respective transparent substrates that are disposed opposing each other with a liquid crystal layer sandwiched between them.

In this drawing, there is a transparent substrate SUB1: this transparent substrate SUB1 is formed with opposed voltage signal lines CL and scan signal lines GL which are provided so that these extend in the x (row) direction thereof and arrayed in parallel in the y (column) direction.

In this drawing, several signal lines are formed in a predetermined order of sequence that when looking at from the upper part in the drawing, there are laid out an opposed voltage signal line CL, a scan signal line GL spaced apart from this opposed voltage signal line CL at a relatively large distance, an opposed voltage signal line CL spaced apart from this scan signal line GL at a relatively small distance, a scan signal line GL spaced apart from this opposed voltage signal line CL at a relatively large distance, . . . .

And, image signal lines DL are formed which extend in the y direction and laid out in parallel in the x direction, which lines are insulated from these opposed voltage signal lines CL and the scan signal lines GL.

In this case, with this embodiment, a common bus line CC3 is formed along with the image signal lines DL, which is disposed for example in substantially the center of a display area to be later described and which extends in the y direction.

More specifically, the signal lines involved are disposed in a manner that in a region scanning from the left-hand to the right-hand part in the drawing, they are laid out in the order of sequence of . . . the image signal line DL, image signal line DL, common bus line CC3, image signal line DL, image signal line DL . . . .

And, this common bus line CC3 defines intersections with said respective opposed voltage signal lines CL that are disposed crossing over this line, at which intersections mutual connections are made.

And, a pixel region is arranged in a region that is surrounded by the opposed voltage signal line CL and the scan signal line GL spaced apart from this opposed voltage signal line CL at a relatively large distance plus respective neighboring ones of the image signal lines DL which are next to each other.

In this case, a certain region surrounded by the image signal line DL neighboring on the left-hand side in the drawing with respect to said common bus line CC3 and the common bus line CC3 plus the opposed voltage signal line CL as well as the scan signal line GL spaced apart from this opposed voltage signal line CL at a relatively large distance becomes a pixel region; a region that is surrounded by the image signal line DL neighboring on the right-hand side in the drawing with respect to said common bus line CC3, this common bus line CC3, the opposed voltage signal line CL, and the scan signal line GL spaced apart from this opposed voltage signal line CL at a relatively large distance becomes a pixel region.

And, an ensemble of such respective pixel regions is arranged to form a display area VW. Note that in the drawing, those single-pixel regions formed along the periphery are not used as the display area VW. This is because an attempt is made to enable appropriate visualization to be performed in respective pixel regions residing inside thereof.

Each pixel region is provided with a thin-film transistor TFT, a pixel electrode PX, and its opposed electrode CT, wherein an image signal from the image signal line DL (one image signal line of the neighboring image signal lines) is supplied to the pixel electrode PX through the thin-film transistor TFT which is turned on in response to a scan signal being supplied to the scan signal line GL.

In addition, the opposed electrode CT formed distant from this pixel electrode PX is connected to said opposed voltage signal line CL. More specifically, this opposed electrode CT is such that a reference signal is supplied via the common bus line CC3 and the opposed voltage signal line CL discussed above.

A practically implemented configuration of said common bus line CC3 and its outlying pixel regions will be described in detail later.

The scan signal line GL being extended from the display area VW is provided with an external terminal GP at the periphery on one end side (the left-hand side in the drawing) of the transparent substrate SUB1, to which terminal GP a scan signal is supplied from a scan signal drive circuit (not shown).

In addition, the image signal line DL being extended from the display area VW is provided with an external terminal DP at the periphery on one end side (the upper side in the drawing) of the transparent substrate SUB1, to which terminal DP an image signal is supplied from an image signal drive circuit (not shown).

And, the common bus line CC3 is provided with an external terminal CP at the periphery on one end side (the upper side in the drawing) of the transparent substrate SUB1 in a way similar to that of the image signal line DL, to which terminal CP a reference signal is supplied.

[Arrangement of Pixel Region]

Figure 2:
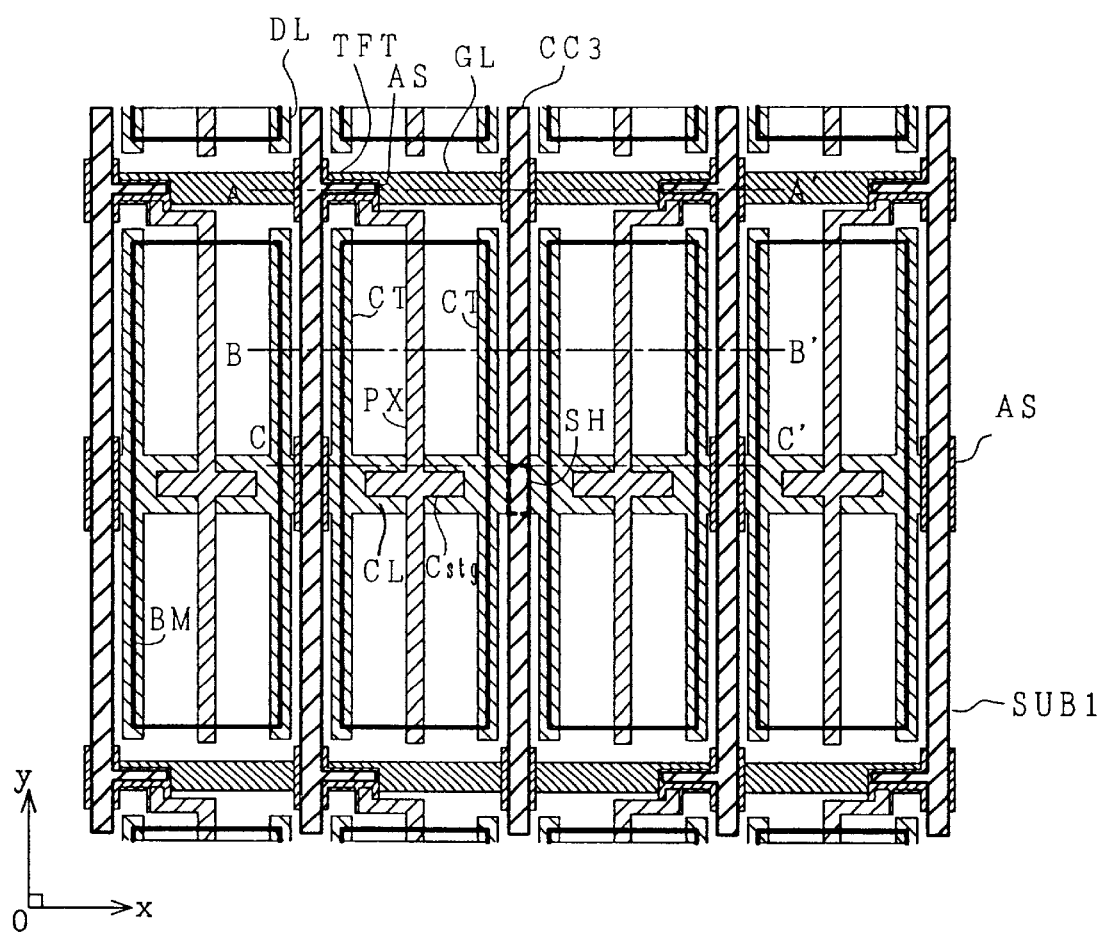
FIG. 2 is a plan view diagram showing one embodiment of a configuration of pixel regions of FIG. 1.
Figure 3A:
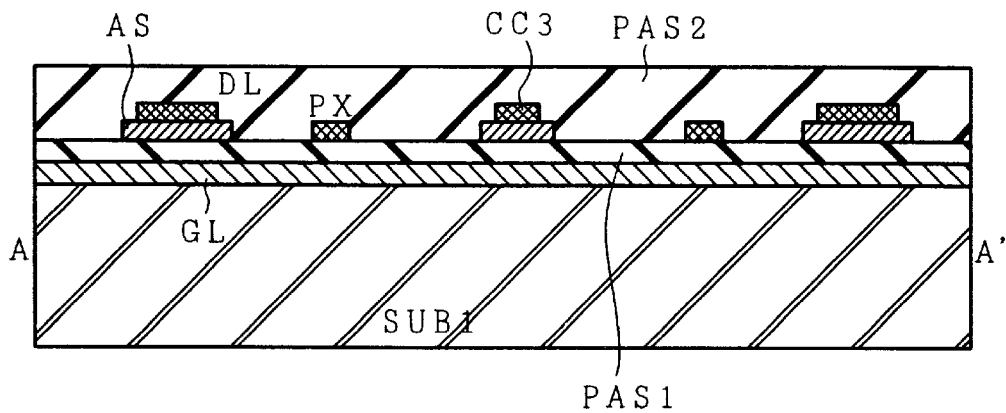
FIG. 3 is cross-sectional diagrams taken along lines A–A', B–B', and C–C' of FIG. 2.
Figure 3B:
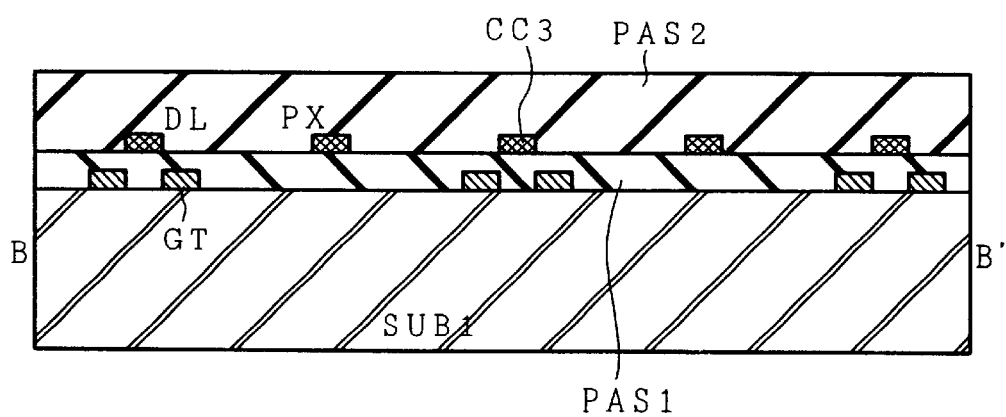
Figure 3C:
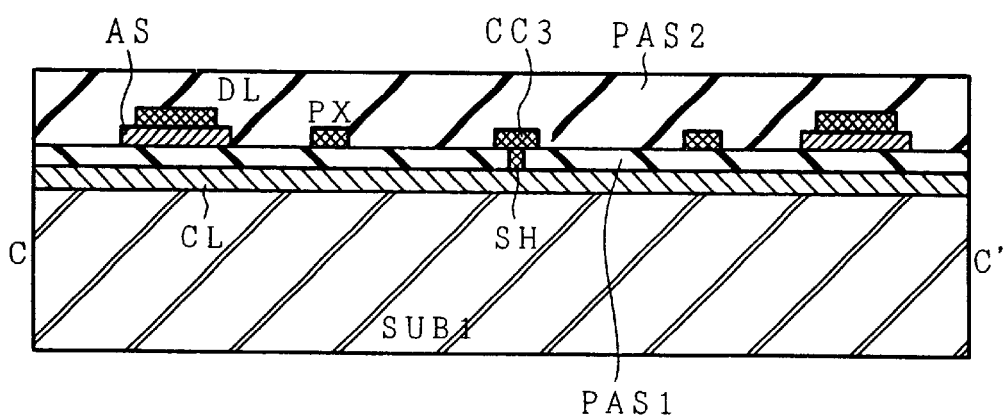

FIG. 2 is a plan view diagram showing one embodiment of the practically implemented arrangement of said common bus line CC3 and those pixel regions residing therearound. Note that a cross-sectional diagram along line A–A' in the same drawing is presented in FIG. 3(a); a sectional diagram along line B–B' is shown in FIG. 3(b); a sectional diagram at line C–C' is in FIG. 3(c).

It is noted that in an explanation below, respective members will be sequentially explained in the order which corresponds to process steps in the manufacture thereof with the transparent substrate SUB1 being as a base.

Firstly, scan signal lines GL have been formed on the liquid crystal-side surface of the transparent substrate SUB1, which lines extend in its x direction and laid out in parallel along the y direction.

And, an opposed voltage signal line CL is formed in substantially the center of these scan signal lines GL, which extends in the x direction. In this embodiment, unlike the case of FIG. 1, a single pixel region is arranged in a region that is surrounded by respective scan signal lines GL that are formed with the common voltage signal line CL residing midway therebetween and neighboring ones (one of them can be the common bus line CC3) of image signal lines DL to be discussed in detail later. This is because of the fact that with such an arrangement, it becomes possible to let the opposed voltage signal line CL be distant from the scan signal line GL thereby making it possible to eliminate occurrence of electrical shorting therebetween.

Said opposed voltage signal lines CL are made, for example, of the same material as that of the scan signal lines GL; simultaneously, they are arranged to be formed integrally with the opposed electrodes CT.

More specifically, the opposed electrodes are CT which consist of two pieces in the case of this embodiment, each of which is so formed as to extend in a direction at right angles to the opposed voltage signal lines CL while lying next to each image signal line DL which will be stated in detailed later.

And, formed on or above the surface of the transparent substrate SUB1 thus arranged is a dielectric film PAS1 (see FIG. 3) which is made for example of a silicon nitride film and covers said signal lines CL, GL and also electrodes CT or the like also.

It is noted that in the following explanation, respective members will be sequentially described in the order which corresponds to process steps in the manufacture thereof, with the transparent substrate SUB1 serving as a base. Firstly, scan signal lines GL are formed on the liquid crystal-side surface of the transparent substrate SUB1, which lines extend in the x direction and are laid out in parallel along the y direction. And, an opposed voltage signal line CL is formed in substantially the center of these scan signal lines GL, which extends in the x direction.

The thin-film transistor TFT formation region is provided overlapping part of a certain region on the surface of this dielectric film PAS1 in which the scan signal line GL is formed: in this region, a semiconductor layer AS is formed which is made of amorphous Si, for example.

This semiconductor layer AS is also formed at an intersection of an image signal line DL to be stated later with respect to scan signal lines GL and opposed voltage signal lines CL, thereby improving the functionality of interlayer dielectricity of respective signal lines.

In addition, this semiconductor layer AS is also formed at an intersection of the common bus line CC3 to be later discussed with respect to its associative scan signal line GL to thereby improve the function of the dielectricity between layers of such signal lines; however, it is not formed at those intersections relative to the opposed voltage signal lines CL. As will be described in detail later, this is because connection between the common bus line CC3 and opposed voltage signal lines CL must be achieved at this portion.

While a switching element of the MIS type with part of the scan signal line GL as its gate electrode is formed by forming a drain electrode and source electrode on the upper surface of said semiconductor layer AS that has been formed in the thin-film transistor TFT formation region, these drain electrode and source electrode are designed to be formed together with the image signal lines DL.

More specifically, the image signal lines DL are formed which extend in the y direction in the drawing and are disposed in parallel in the x direction. In this case, the common bus line CC3 also is formed along with these image signal lines DL in such a way that in a zone spanning from the left-hand part to the right-hand part in the drawing, the image signal line DL, image signal line DL, common bus line CC3, image signal line DL, and image signal line DL are laid out in this order at equal intervals between any adjacent ones of them.

Note here that the image signal lines DL and the common bus line CC3 are made of the same material by way of example; also, these are arranged to be fabricated at the same process step.

Here, an arrangement of a certain pixel region will first be explained which is placed on the left-hand side in the drawing with the common bus line CC3 being as a boundary.

An image signal line DL on the left-hand side in the drawing with respect to the pixel region is such that its part is extended up to the thin-film transistor formation region permitting formation of a drain electrode. A source electrode also is arranged to be formed simultaneously during formation of the image signal line DL.

In this case, the source electrode is formed in a manner integral with a pixel electrode PX: this pixel electrode PX is so formed as to extend centrally through the pixel region from the upper side to the lower side in the drawing.

More specifically, the pixel electrode PX is placed at the center of the opposed electrode CT stated above, and is disposed so that an equal distance is left between it and each opposed electrode CT.

In addition, a portion of the pixel electrode PX which overlaps the opposed voltage signal line CL is a region of relatively large area; at this portion, a capacitive element Cstg is formed with said insulative film PAS1 being as its dielectric film.

Upon supplying of a scan signal to the scan signal line GL, the thin-film transistor TFT is turned on; through this turn-on thin-film transistor TFT, an image signal from the image signal line DL is supplied to the pixel electrode PX. Due to supplement of the reference signal to the opposed electrode CT via the common bus line CC3 and opposed voltage signal line CL in a way as will be described later, an electric field with a potential difference corresponding to the image signal (an electric field having its components in parallel to the transparent substrate SUB1) takes place between the pixel electrode PX and opposed electrode CT resulting in achievement of the optical transmissivity of liquid crystal in accordance with such electric field intensity.

And, even upon interruption of the scan signal being supplied to the scan signal line GL, said capacitive element Cstg serves to allow the image signal to be stored at the pixel electrode PX for a predetermined time period.

Next, those pixel regions placed on the right-hand side of the common bus line CC3 in the drawing are constituted by a pattern that is in linear symmetry with the pixel regions placed on the left-hand side of the common bus line CC3 in the drawing.

More specifically, the pixel regions placed on the right-hand side in the drawing are such that an image signal from the image signal line DL on the right-hand side in the drawing with respect to such pixel regions is supplied via the thin-film transistor TFT to the pixel electrode PX.

And, the common bus line CC3 is connected, at its portion whereat it intersects the opposed voltage signal line CL, to this opposed voltage signal line CL via a through-hole SH that was preformed in said insulative film PAS1.

Whereby, the reference signal to be supplied from the common bus line CC3 will then be applied to the opposed electrode CT via the opposed voltage signal line CL.

Further, a protective film PAS2 (see FIG. 3) is formed on the surface on which the image signal line DL, pixel electrode PX, and common bus line CC3 are formed in the way stated above, the film covering them also and having its surface on which an orientation or "alignment" film (not shown) is to be formed.

According to the liquid crystal display device in accordance with such embodiment, the common bus line CC3 for use in common connection of respective opposed voltage signal lines CL is within the region of the display area VW rather than outside of this region.

Upon supplying a scan signal to the scan signal line GL, the thin film transistor TFT is turned on; and, through this operation of the thin-film transistor TFT, an image signal from the image signal line DL is supplied to the pixel electrode PX. Due to supply of the reference signal to the opposed electrodes CT via the common bus line CC3 and opposed voltage signal line CL in a way that will be described later, an electric field with a potential difference corresponding to the image signal (an electric field having its components in parallel to the transparent substrate SUB1) is produced between the pixel electrode PX and the opposed electrodes CT resulting in generation of a field which controls the optical transmissivity of the liquid crystal in accordance with such electric field intensity. And, even upon interruption of the scan signal being supplied to the scan signal line GL, said capacitive element Cstg serves to allow the image signal to be stored at the pixel electrode PX for a predetermined time period.

And, more than one opposed voltage signal line CL intervening when the reference signal is supplied from the common bus line CC3 to the opposed electrode CT is substantially shortened resulting in a decrease in its resistance, which in turn makes it possible to lower distortion of the reference signal.

Embodiment 2

[Arrangement of Pixel Region]

Figure 4:
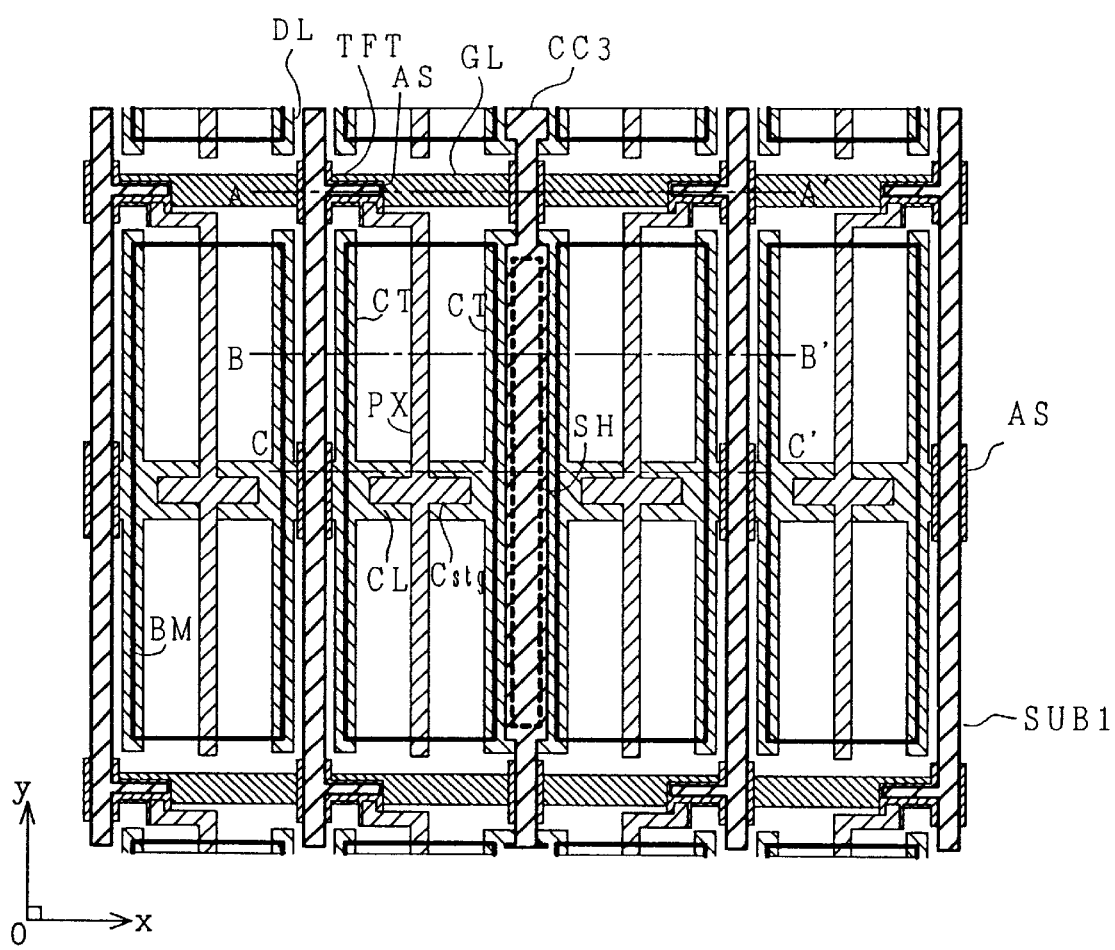
FIG. 4 is a plan view diagram showing one embodiment of a pixel region configuration of a liquid crystal display device in accordance with the present invention.
Figure 5A:
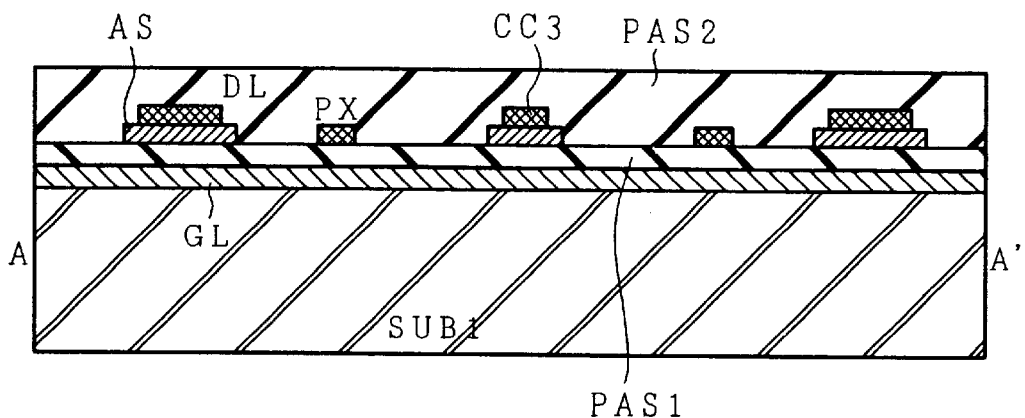
FIG. 5 is sectional diagrams taken along lines A–A', B–B', and C–C' of FIG. 4.
Figure 5B:
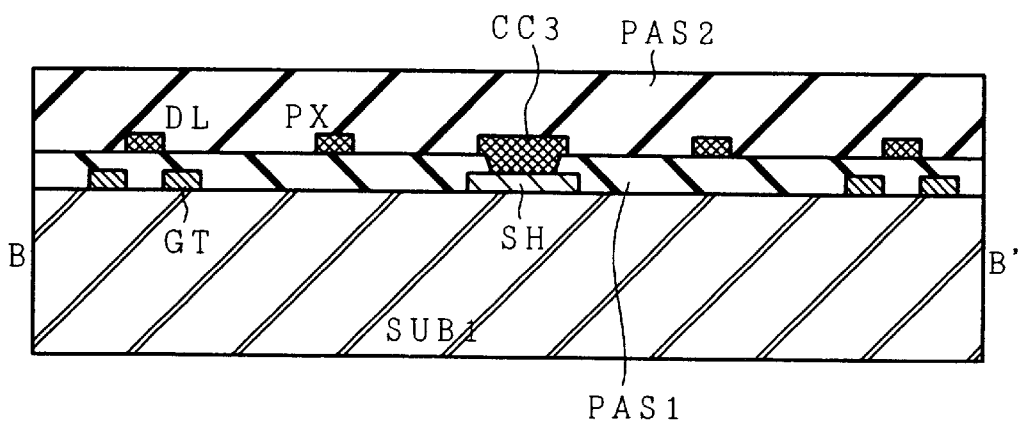
Figure 5C:
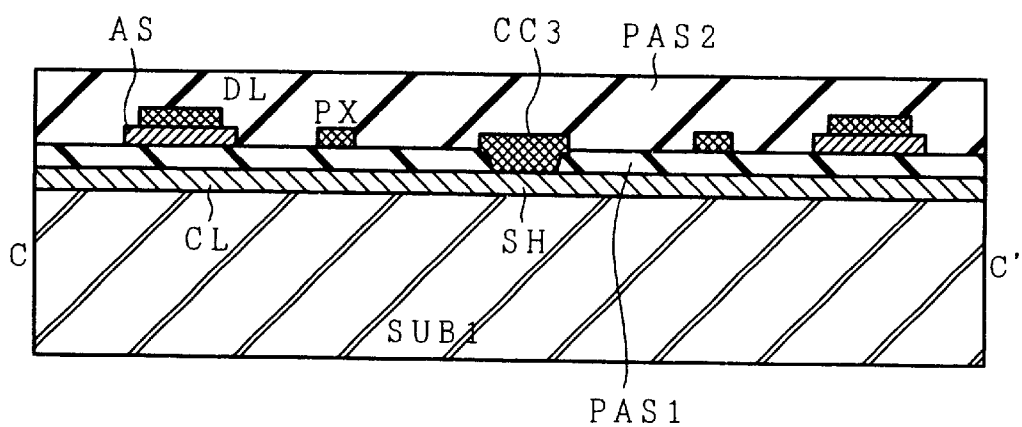

FIG. 4 is a plan view diagram showing another embodiment which is a further improved version of that of FIG. 2. A sectional view taken along line A–A' of the same drawing is illustrated in FIG. 5(a), and a sectional view along line B–B' is depicted in FIG. 5(b), while a sectional diagram at line C–C' is shown in FIG. 5(c).

In the drawing, a difference from FIG. 2 lies in the common bus line CC3 and also in the opposed electrode CT of pixel regions placed on the opposite sides of this common bus line CC3.

More specifically, each of respective opposed electrodes CT next to the common bus line CC3 of those opposed electrodes CT of such pixel regions placed on the opposite sides of the common bus line CC3 is integral with others in such a way as to bury a region therebetween. In other words, respective opposed electrodes CT are made common with one another; in addition thereto, these are formed as an electrode (also referred to as the "commonized opposed electrode" where necessary) capable of extremely enlarging the width thereof.

And, the common bus line CC3 is formed overlying this commonized opposed electrode with its insulative layer PAS1 laid therebetween.

In this case, since the common bus line CC3 can be formed to cover other regions excluding specified regions of such widened commonized opposed electrode which function as the inherent common electrode, it becomes possible to achieve width-increase formation at certain portions that overlap this commonized opposed electrode.

Further, connection of this common bus line CC3 with respect to the opposed voltage signal lines CL will substantially constitute a double-layered structure at this portion as a result of formation with coverage up to the commonized opposed electrode that extends in the y direction.

It is thus possible to extremely reduce the resistance value of the entire common bus line CC3; in the case where the reference signal is supplied to the opposed electrode CT via this common bus line CC3 and opposed voltage signal line CL, it will become possible to greatly suppress generation of waveform distortion of such signal.

Embodiment 3

Figure 6:
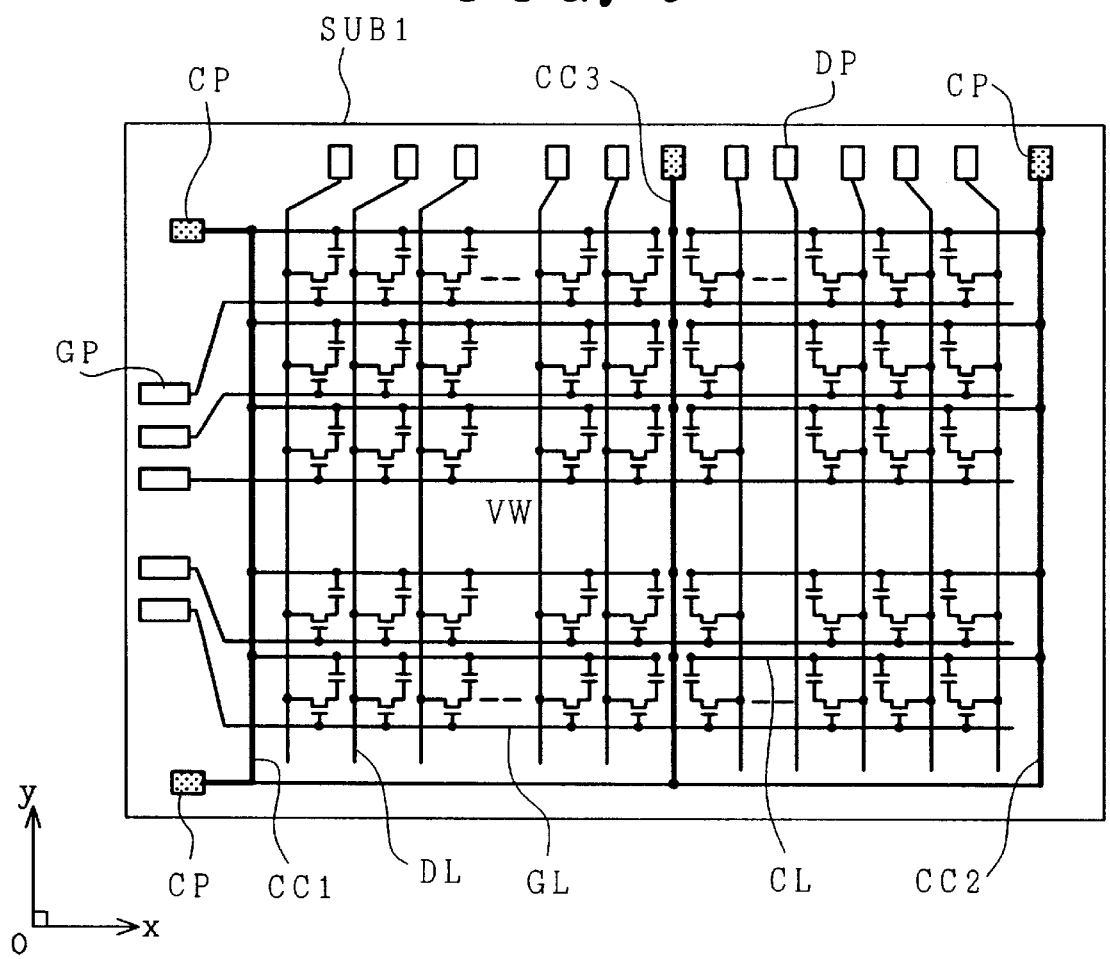
FIG. 6 is an equivalent circuit diagram showing an overall configuration showing another embodiment of the liquid crystal display device in accordance with the present invention.

FIG. 6 is a plan view diagram showing another embodiment of the liquid crystal display device in accordance with the present invention, which is a diagram corresponding to FIG. 1.

An arrangement different from FIG. 1 is that irrespective of the fact that at the opposed voltage signal lines CL the common bus line CC3 extending in the y direction is present within its display area VW, other common bus lines CC1, CC2 are provided letting end portions of the opposed voltage signal lines CL be connected to one another in a region outside the display area VW.

In the case with such arrangement above, since respective reference signals from the plurality of common bus lines CC1, CC2, CC3 are supplied to all of the common electrodes CT via the common voltage signal lines CL with relatively short routes, it becomes possible to. greatly perform suppression of waveform distortion thereof.

This particularly renders apparent that significant inconvenience will hardly occur even when an attempt is made to increase resistivity of the other common bus lines CC1, CC2. Thus, it becomes possible to reduce the line width of the other common bus lines CC1, CC2, which in turn makes it possible to allow the "window casing" to have less size than in the prior art.

Additionally, needless to say, the above-mentioned effect can be obtained in this case even where the arrangement of the common bus line CC3 is designed as shown in FIG. 2 or FIG. 4.

And, in the case employing such arrangement, it will be able to roughly determine which one of CC1, CC2, CC3 in each pixel region is a common bus line that has significant influence on supplement of the reference signal toward its opposed electrode CT. In this case, in view of the fact that the resistance and capacitance of such signal transmission route become different, it offers an effect of enabling uniformarization of them by providing said common bus line CC3 at which position (letting it come closer to the side of the common bus line CC1, or alternatively to the common bus line CC2 side).

Although, in this embodiment, the other common bus lines CC1, CC2 are provided at respective end portions of the opposed voltage signal lines CL, exclusive limitation should not be directed only to this; only one-end side may be permissible. In other words, either one of the common bus line CC1 or CC2 may be eliminated.

Figure 7:
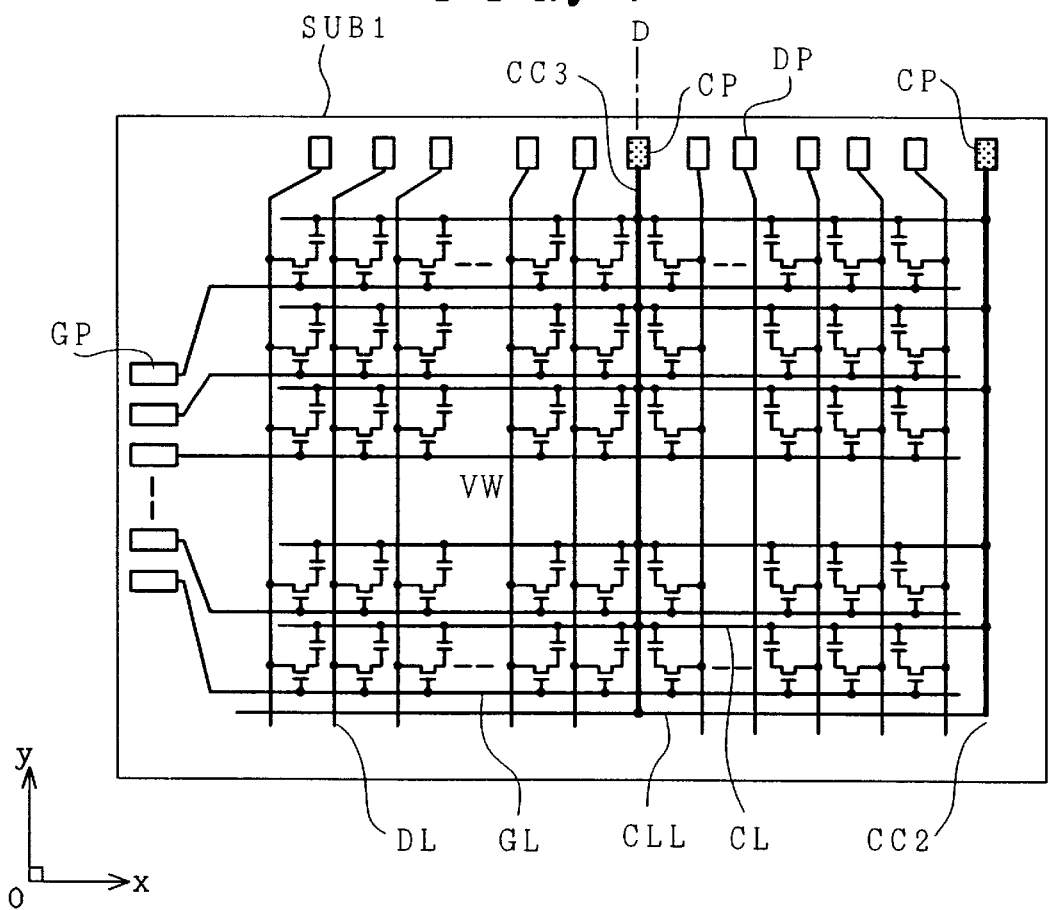
FIG. 7 is an equivalent circuit diagram showing an overall configuration showing another embodiment of the liquid crystal display device in accordance with the present invention.

FIG. 7 is a plan view diagram showing the case of providing the common bus lines CC3 and CC2.

Here, the common bus line CC2 is provided on a selected side on which those terminals GP of the scan signal lines GL are not formed.

And, this common bus line CC2 is provided without crossing over the scan signal lines GL.

Due to this, it becomes possible to decrease the coupling capacitance between the common bus line CC2 and the scan signal lines GL, thus permitting obtainability of an effect of letting the display improve in quality.

Embodiment 4

Figure 8:
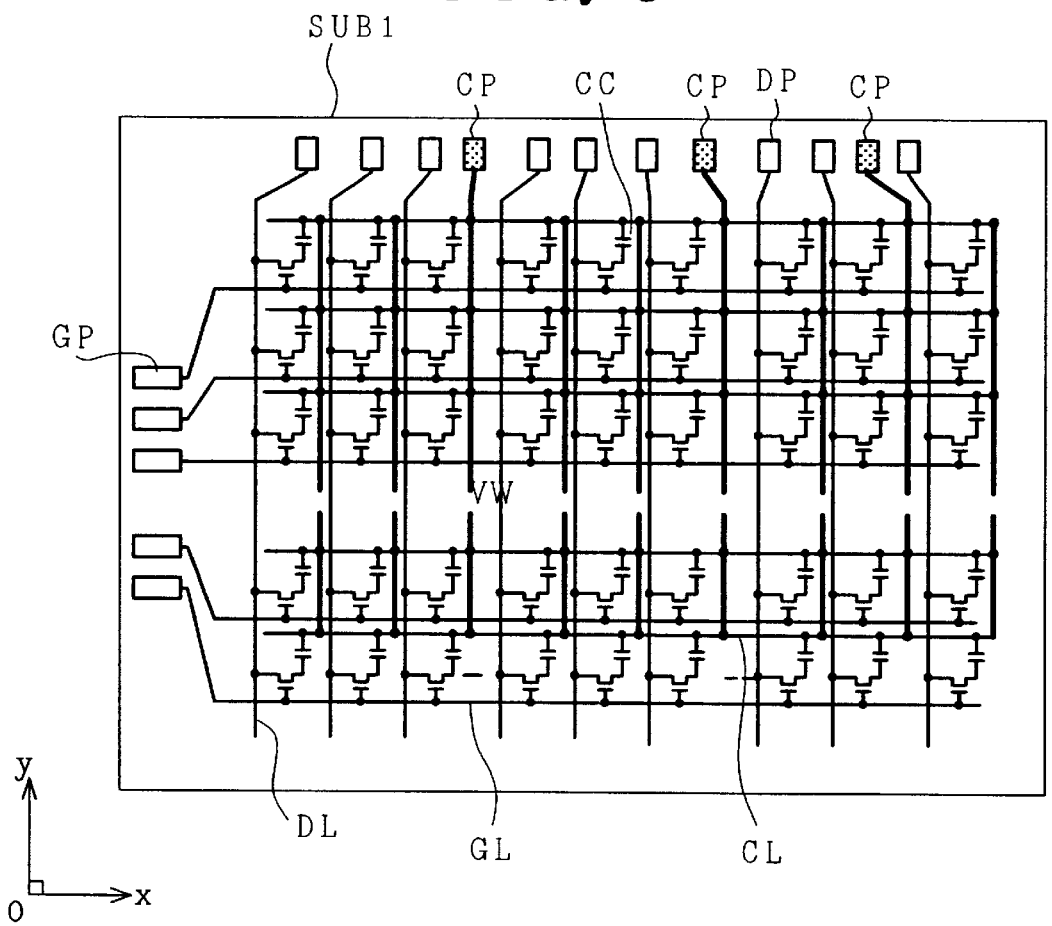
FIG. 8 is an equivalent circuit diagram showing an overall configuration showing another embodiment of the liquid crystal display device in accordance with the present invention.

FIG. 8 is a plan view diagram showing another embodiment of another liquid crystal display device in accordance with the present invention.
[Overall Arrangement]
FIG. 8 is an equivalent circuit diagram corresponding to FIG. 1.

In this drawing, a difference from FIG. 1 to be stated first is that the common bus lines CC provided extending within the display area VW in its y direction are formed on a one-per-pixel region basis in a manner such that one line is for each of pixel regions as disposed in the y direction. More specifically, with respect to each pixel region, the common bus line CC is laid out along with the opposed voltage signal line CL so that they are adjacent to the pixel region (in the drawing, the opposed voltage signal line CL is on the upper side of the pixel region whereas the common bus line CC is on the right-hand side of the pixel region).

In addition thereto, an image signal being supplied to a respective pixel electrode in each of the pixel regions disposed in the y direction is arranged to income from the image signal line DL on one side (for example, on the left-hand side in the drawing).

To this end, said each common bus line CC is designed so that it is disposed next to the image signal line DL.

And, these respective common bus lines CC are common-coupled together at the upper-side end portions and right-hand end portions in the drawing, thereby allowing reference signals to be supplied from several terminals CP that are laid out within the terminals DP of image signal lines DL.

Figure 9:
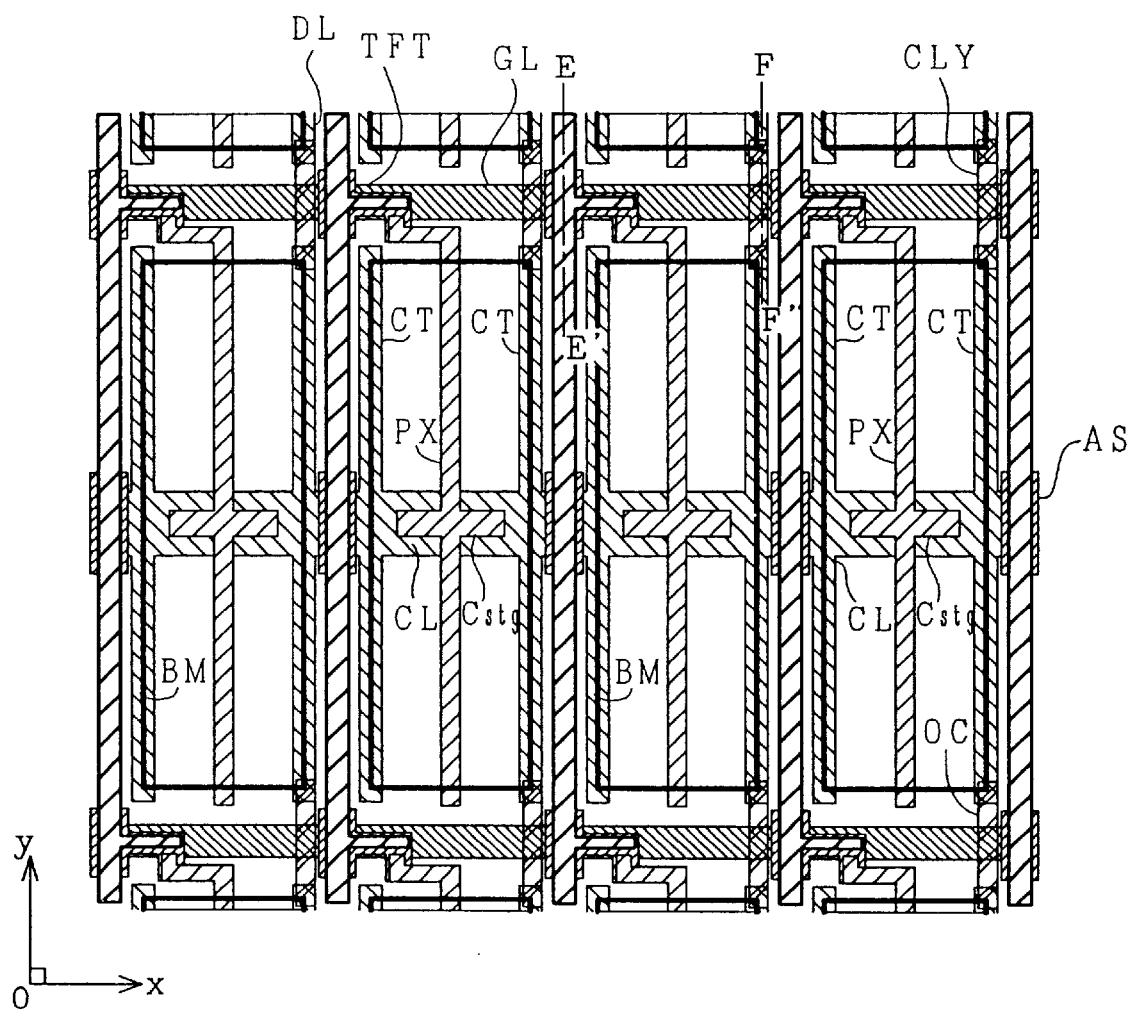
FIG. 9 is an enlarged plan view showing one embodiment of a structure of pixel regions of FIG. 8.
Figure 10A:
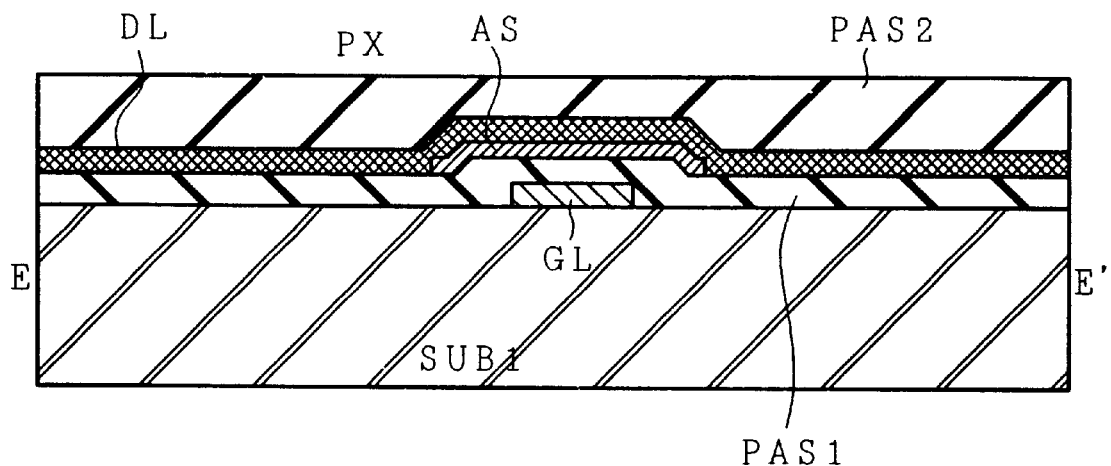
FIG. 10 is a sectional diagram along lines E–E' and F–F' of FIG. 9.
Figure 10B:
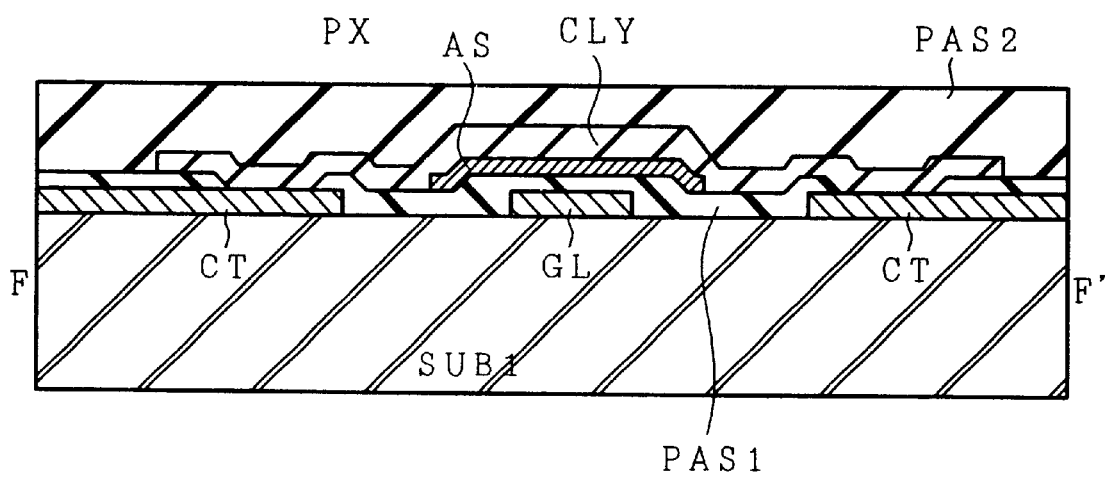

It is to be noted that although in this embodiment the common bus lines CC are formed so that each is associated with one of the pixel regions disposed in the y direction, exclusive limitation thereto should not be done; for example, formation may be done in those pixel regions disposed in the y direction at intervals of a constant number (distance of the pixel regions in the x direction).
[Arrangement of Pixel Region]
FIG. 9 is a plan view diagram showing one practically reduced embodiment of the pixel region of FIG. 8. Note here that in FIG. 9, a sectional view taken along its line E–E' is shown in FIG. 10(a), and a sectional view at line F–F' is in FIG. 10(b).

In FIG. 9, there is in a pixel region an opposed electrode CT which is provided next to an image signal line DL on one side (on the right-hand side in the drawing): this opposed electrode CT is electrically connected together to a corresponding opposed electrode CT of other neighboring pixel regions as disposed in the y direction.

Summarizedly, based on the fact that the opposed electrodes CT are formed of the same layer as scan signal lines GL, they are to be formed in the state that these are physically separated from each other providing no electrical connections therebetween.

Due to this, the respective opposed electrodes CT are caused to be connected together by a conductive layer CLY which is formed to stride over said scan signal line GL after having formed the insulative film PAS1 (see FIG. 10).

Such connection of these respective opposed electrodes CT is all done between neighboring pixel regions in respective pixel regions disposed in the y direction.

This makes it possible for the connection body of these respective opposed electrodes CT to let them function as the common bus lines CC.

This means that it will no longer be required that the formation regions of common bus lines CC within the pixel regions be particularly reserved; accordingly, it offers an effect of eliminating any degradation of the aperture ratio at the conventional pixel region size.

Said conductive layer CLY is such that it becomes possible to avoid an increase in number of production process steps by forming the layer using the same material as that of the image signal lines DL during formation of image signal lines DL after having preformed through-holes in said insulative film PAS1.

Although the common bus lines CC thus fabricated are the ones that are relatively narrow in line width and yet large in resistivity, it becomes possible to greatly suppress increase of resistivity as a whole due to the fact that relatively many common bus lines are formed as shown in FIG. 8 resulting in a decrease in distance up to the opposed electrodes CT.

Thus, it becomes possible to suppress increase of wave-form distortion of the reference signal or signals.

Then, in the above described embodiments 1 to 4, by disposing at least common bus line CC3 in the center portion of display viewing region, it becomes possible to make distance between the common bus line and an opposed electrode disposed at longest distance more shorten, therefore, it becomes possible to reduce wave-form distortion of the reference signal. Practically, when liquid crystal display is driven, an opposed electrode CL has possibility of voltage sift which is one cause of wave-form distortion by dielectric effect from pixel electrode, because data signal lines DL are applied several kinds of voltage at same time and high frequency interval. Therefore, a feedback element may be disposed to at least one of common bus lines CC1 to 3 in the embodiments 1 to 4 (Figure is abbreviated). The feedback element is capable to be disposed at terminal side or opposed side to be connected to driving circuits, however, under consideration of layout and function, preferable portion to be disposed is at the opposed side of the terminal.

Additionally, in the above described embodiments 1 to 4, by disposing at least common bus line CC3 in the center portion of display viewing region, it becomes possible to make distance between the common bus line and an opposed electrode disposed at longest distance more shorten and reduce maximum resistance between the common bus line and an opposed electrode. Therefore, it is also possible to improve the opening rate in each pixels by forming material of the common bus line with transparent electrode, e.g. ITO(Indium Thin Oxide), which has relatively high resistance. In that case, it goes without saying that it become to improve the opening rate in each pixels by forming pixel electrode PX with transparent electrode of the same layer.

Figure 11:
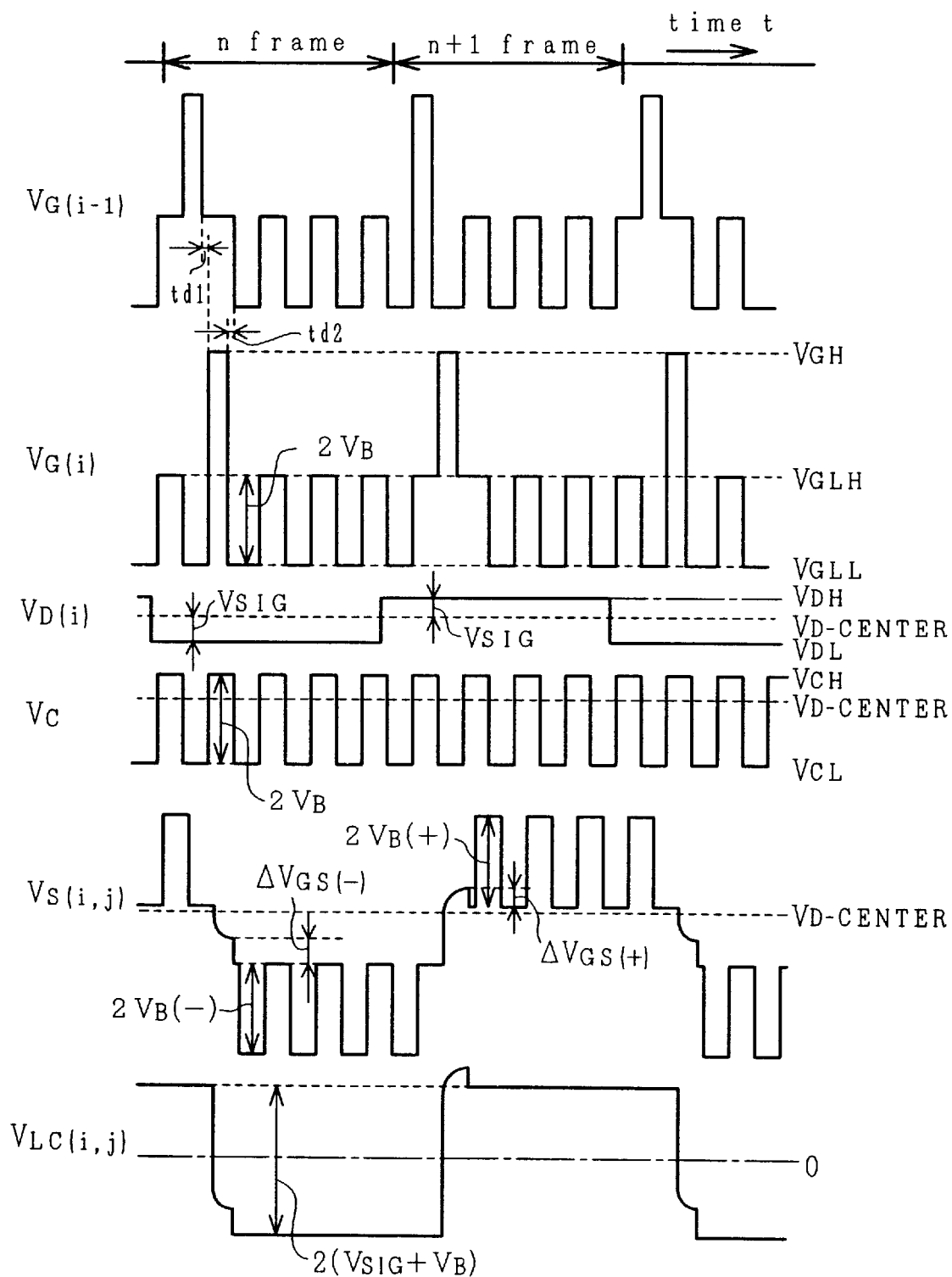
FIG. 11 is a diagram illustrating wave-forms for driving the liquid crystal display of the present invention.

Furthermore, FIG. 11 illustrates waveforms for driving the liquid crystal display of the present invention. When the opposed voltage signal lines CL are formed with low resistance conductive layer as like aluminum, the load impedance is small and the wave-form distortion of the opposed electrode becomes to be reduced. Therefore, it has advantages of employing an AC voltage to the opposed electrode and reducing video signal voltage. That is to say that the opposed voltage has an AC rectangular waveform and has two value, i.e., VCH and VCL. In synchronism therewith, the non-selection voltage of the scanning signals Vg(i−1) and Vg(i) is changed into two value, i.e., VGLH and VGLL for every scanning period. The amplitude of the opposed voltage is set to be equal to the amplitude of the non-selection voltage. The video signal voltage has a value which is the remainder obtained by subtracting one-half the amplitude of the opposed voltage from a voltage that is to be applied to the liquid crystal layer.

The opposed voltage may be a DC voltage. By employing an AC voltage, however, it is possible to lower the maximum amplitude of the video signal voltage and, hence, to employ a video signal driver- unit having a decreased breakdown voltage. When the opposed voltage signal lines CL are formed with transparent conductive layer, the opposed voltage is desirable to be a DC voltage because it has relatively high resistance.

Figure 12:
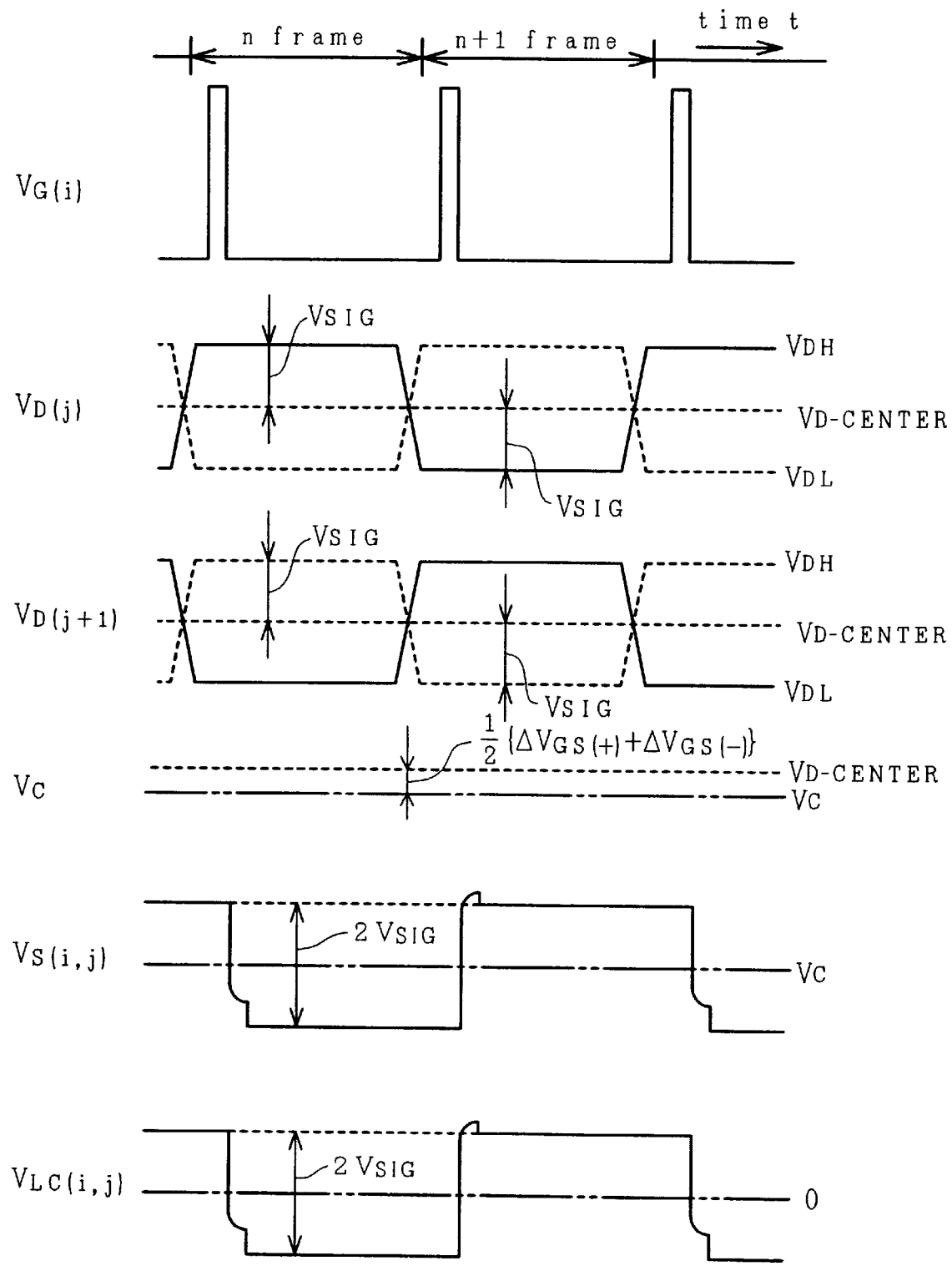
FIG. 12 is a diagram illustrating other wave-forms for driving the liquid crystal display of the present invention.

FIG. 12 illustrates waveforms by employing DC voltage.

The storage capacitor Cstg is provided in order to store video data written into a pixel (after the thin-film transistor TFT is turn off) for extended period of time. According to the system in which the electric field is applied in parallel with the surface of the substrate employed by the present invention unlike the system in which the electric field is applied vertically to the surface of the substrate, there exists almost no capacitance (so-called liquid crystal capacitance) that is created by pixel electrode and the opposed electrode. Namely, the liquid crystal capacitance is incapable of storing video data in the pixel. In the system in which the electric field is applied in parallel with the surface of the substrate, therefore, the storage capacitor Cstg is an essential constituent element. When the thin-film transistor TFT undergoes the switching operation, furthermore, the storage capacitor Cstg serves to lower the effect of a change $\Delta Vg$ in the gate potential upon the pixel electrode potential Vs. This is expressed by the following formula, $$\Delta Vs = \{C_{gs}/(C_{gs}+C_{stg}+C_{pix})\} \times \Delta Vg$$

where Cgs is the parasitic capacitance formed between the gate electrode and the source electrode of the thin-film transistor, Cpix is the capacitance formed between the pixel electrode PX and the opposed electrode CT, and $\Delta Vs$ is the change in the pixel electrode potential caused by $\Delta Vg$, i.e., is feed-through voltage. This cahnge$\Delta Vs$ is a cause of the DC component applied to the liquid crystal LC, but can be decreased with an increase in the strage capacity Cstg. A decrease in the DC component applied to the liquid crystals LC leads to a long life of the liquid crystals LC and reduces the so-called printing image in which the preceding picture remains when the picture on the liquid crystal display screen is changed.

Since the size of the gate electrode is increased so as to cover the i-type semiconductor layer AS, the area where the gate electrode and the source or drain electrode overlap one upon the other is accordingly increased and, hence, the parasitic capacitance Cgs is increased, giving an adverse effect the pixel electrode potential Vs is easily affected by the gate (scanning) signal Vg. However, the provision of the strage capacitor Cstg eliminates this demerit.

As apparent from the foregoing explanation, according to the liquid crystal display device incorporating the principles of the present invention, it becomes possible to suppress waveform distortion of one or more reference signals to be supplied to the opposed electrodes without having to suffer from an increase of the window casing-like frame or "fascia."

What is claimed is:

1. A liquid crystal display comprising respective pixel regions laid out in a matrix form in a display area on a liquid crystal-side surface of one transparent substrate of respective transparent substrates disposed opposite each other with a liquid crystal sandwiched therebetween, and a pixel electrode and an opposed electrode arranged so as to be spaced apart from each other in each of these pixel regions, wherein the transmissivity of light passing between respective electrodes is controlled by an electric field created between these respective electrodes, and wherein parallel opposed voltage signal lines and parallel scan signal lines extend in a row direction of the pixel regions and a respective one of said opposed voltage signal lines is disposed between two of the scan lines extending in the row direction and connects together respective opposed electrodes within each of the pixel regions laid out in the row direction, and wherein a common bus line connecting together respective ones of said opposed voltage signal lines is formed within said display area so that it extends in the column direction, and wherein at least on one end side of respective opposed voltage signal lines lying outside of the display area, a further common bus line is formed by which these opposed voltage signal lines are connected together.

2. A liquid crystal display according to claim 1, wherein a plurality of common bus lines are formed in the display area to extend in the column direction.

3. A liquid crystal display according to claim 2, wherein the common bus line is constituted by connecting an opposed electrode formed in a pixel region to a corresponding opposed electrode in a pixel region neighboring thereto in the column direction.

4. A liquid crystal display according to claim 1, wherein at one end side of respective opposed voltage signal lines lying outside of the display area, the further common bus line is formed by which these opposed voltage signal lines are connected together, and wherein this further common bus line does not cross over any of said scan signal lines.

5. A liquid crystal display according to claim 1, wherein image signal lines extending in the column direction are formed on the opposite sides of said pixel regions disposed in the column direction so that an image signal selected from one of the image signal lines is supplied to each pixel region, and each of the pixel regions on one side of a boundary defined by the common bus line extending within the display area is arranged such that a pixel signal for a pixel electrode formed therein is taken from an image signal line disposed on said one sides whereas each pixel region on a remaining side allows a pixel signal for a pixel electrode formed therein to be taken from an image signal line laid out on the remaining side.

6. A liquid crystal display according to claim 5, wherein those opposed electrodes of respective pixel regions neighboring each other while defining as a boundary the common bus line extending within the display area include respective ones of respective opposed electrodes adjacent to the common bus line which are rendered integral with one another to cover a region between them while simultaneously letting the common bus line be formed overlying the integral opposed electrodes for connection to the opposed electrodes.

7. A liquid crystal display according to as claim 6, wherein supply of the selected image signal from the image signal line toward the pixel electrode is effected through a switching element.

8. A liquid crystal display according to claim 1, wherein those opposed electrodes of respective pixel regions disposed on the opposite sides of the common bus line extending within the display area are formed in close proximity to the common bus line and also are formed integrally with the common bus line.

9. A liquid crystal display according to claim 1, wherein video signal lines are provided, and wherein each of the video signal lines disposed on the left side of said common bus line are laid out on the left side of respective pixel electrodes which are supplied with a video signal via respective video signal lines, and each of the video signal lines disposed on the right side of said common bus line are laid out on the right side of respective pixel electrodes which are supplied with a video signal via respective video signal lines.

10. A liquid crystal display according to claim 1, wherein a respective one of said opposed voltage signal lines is disposed substantially in a center between two of the scan lines extending in the row direction.

* * * * *